(12) United States Patent
Lutz

(10) Patent No.: US 12,656,760 B2
(45) Date of Patent: Jun. 16, 2026

(54) METHOD AND CONTROL SYSTEM FOR A TECHNICAL PLANT USING A TREND CURVE DIAGRAM

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 398 days.

(21) Appl. No.: 18/561,482

(22) PCT Filed: May 18, 2022

(86) PCT No.: PCT/EP2022/063414

§ 371 (c)(1),
(2) Date: Nov. 16, 2023

(87) PCT Pub. No.: WO2022/243362

PCT Pub. Date: Nov. 24, 2022

(65) Prior Publication Data

US 2024/0248459 A1     Jul. 25, 2024

(30) Foreign Application Priority Data

May 19, 2021    (EP) ..................................... 21174860

(51) Int. Cl.
*G05B 19/418*        (2006.01)
*G05B 23/02*         (2006.01)
(52) U.S. Cl.
CPC .................. *G05B 19/41835* (2013.01); *G05B 2219/37591* (2013.01)
(58) Field of Classification Search
CPC .... G05B 19/41835; G05B 2219/37591; G05B 23/0272

(Continued)

(56) References Cited

U.S. PATENT DOCUMENTS

| | | | | |
|---|---|---|---|---|
| 7,389,204 B2* | 6/2008 | Eryurek | ............. | G05B 23/0272 |
| | | | | 340/506 |
| 8,311,651 B2* | 11/2012 | Spanke | .............. | G05B 19/0421 |
| | | | | 702/183 |

(Continued)

FOREIGN PATENT DOCUMENTS

| | | |
|---|---|---|
| EP | 3796119 | 3/2021 |
| EP | 3805882 | 4/2021 |

OTHER PUBLICATIONS

PCT International Preliminary Examination Report and Written Opinion of the Examination Authority mailed Aug. 23, 2023 based on PCT/EP2022/063414 filed May 18, 2022.

*Primary Examiner* — Jaime Figueroa
(74) *Attorney, Agent, or Firm* — Cozen O'Connor

(57)         ABSTRACT

A method for visually representing temporally aggregated measurement values includes generating image information over a period of time from temporally aggregated measurement values of a measurement variable associated with a technical object of a technical plant by an operator station server of a control system of the technical plant, adding information to the image information concerning fuzziness of the temporal aggregation of a specific temporally aggregated measurement value by comparison with the non-aggregated measurement values taken into consideration for the temporal aggregation of the specific measurement value, transmitting the image information to an operator station client, visually presenting the time profile of the temporally aggregated measurement values and the information concerning the fuzziness of the specific temporal aggregation of the temporally aggregated measurement points to an operator of the technical plant.

15 Claims, 3 Drawing Sheets

(58) Field of Classification Search
USPC ........................................................... 700/28
See application file for complete search history.

(56) References Cited

U.S. PATENT DOCUMENTS

| | | | | |
|---|---|---|---|---|
| 10,671,040 | B2 * | 6/2020 | Drumm ................. | G05B 19/056 |
| 10,732,618 | B2 | 8/2020 | Xin et al. | |
| 11,899,527 | B2 * | 2/2024 | Lin ..................... | G05B 23/0281 |
| 11,947,339 | B2 * | 4/2024 | Lu .......................... | G06N 5/022 |
| 2002/0163427 | A1 * | 11/2002 | Eryurek ............... | G05B 23/027 |
| | | | | 340/500 |
| 2003/0046027 | A1 * | 3/2003 | Kitamura ............... | G21C 17/00 |
| | | | | 702/182 |
| 2004/0113912 | A1 * | 6/2004 | Brooks ............. | G05B 23/0272 |
| | | | | 345/440 |
| 2005/0197805 | A1 * | 9/2005 | Eryurek ............. | G05B 23/0272 |
| | | | | 702/188 |
| 2008/0154411 | A1 * | 6/2008 | Steinbach ........ | G05B 19/41865 |
| | | | | 700/97 |
| 2009/0281665 | A1 * | 11/2009 | Spangler .......... | G05B 19/41815 |
| | | | | 700/275 |
| 2013/0002697 | A1 * | 1/2013 | Ashley .................... | G06T 11/26 |
| | | | | 345/589 |
| 2013/0100136 | A1 * | 4/2013 | Van Camp ......... | G05B 23/0267 |
| | | | | 345/440 |
| 2014/0067105 | A1 * | 3/2014 | Reggio .................. | G05B 15/02 |
| | | | | 700/97 |
| 2014/0303798 | A1 * | 10/2014 | Saliba .................... | G06Q 50/06 |
| | | | | 700/291 |
| 2015/0105875 | A1 * | 4/2015 | Tran ...................... | G06F 3/0482 |
| | | | | 700/83 |
| 2015/0106753 | A1 * | 4/2015 | Tran ................... | G05B 23/0272 |
| | | | | 715/765 |
| 2016/0299966 | A1 * | 10/2016 | Dhollander ......... | G06F 16/3331 |
| 2017/0248942 | A1 * | 8/2017 | Sudo ................. | G05B 23/0272 |
| 2017/0277771 | A1 * | 9/2017 | Kanemaru ............... | G06F 7/02 |
| 2019/0086911 | A1 | 3/2019 | Xin et al. | |
| 2021/0109504 | A1 | 4/2021 | Lutz | |
| 2021/0397166 | A1 * | 12/2021 | Sayyarrodsari .......... | G06F 8/30 |
| 2022/0342409 | A1 | 10/2022 | Lutz | |

\* cited by examiner

METHOD AND CONTROL SYSTEM FOR A TECHNICAL PLANT USING A TREND CURVE DIAGRAM

CROSS-REFERENCE TO RELATED APPLICATIONS

This is a U.S. national stage of application No. PCT/EP2022/063414 filed 18 May 2022. Priority is claimed on European Application No. 21174860.3 filed 19 May 2021, the content of which is incorporated herein by reference in its entirety.

BACKGROUND OF THE INVENTION

1. Field of the Invention

The invention relates to a control system of a technical plant, which has at least one operator station server and one operator station client and relates to a method for visual representation of temporally aggregated measured values and the use of the control system to operate the technical plant.

2. Description of the Related Art

Measurement values, which are to be allocated to measured variables pertaining to technical objects such as sensors of a technical plant, can be visually presented to an operator of the technical plant during the course of management and monitoring of the technical plant. A temporal course of the measured values pertaining to the measured variable is often represented to be able to easily identify changes in the measured values. Reference is also made in this connection to trend curves or trend curve diagrams.

If more measuring points of a measured variable exist for a considered period of a trend curve than can be represented in the region to be represented of a display apparatus of the technical plant, then the number of measuring points is mathematically reduced by aggregation. If, for example, 28.800 measuring points exist for a period to be represented and the drawing area is only 1.024 pixels in size, 28 measuring points have to be added up to one aggregated measuring point respectively. Various methods are known for conducting such an aggregation, for example:

Max/Min: here, only the measuring point with the smallest and the measuring point with the greatest measured value is drawn Mean: the mean of all measuring points is represented Sliding mean: The sliding mean of all measuring points is represented, i.e., the adjacent aggregated measuring points also flow into the aggregation of the measuring point in order to generate a "harmonic course of the curve". This is the most common aggregation variant.

Every aggregation method entails a crucial disadvantage, however. Compared to the raw data, a deviation, i.e., a fuzziness, always exists after the aggregation. This can falsify the representation of the trend course depending on an extent of the deviation (in other words, depending on fuzziness). A trend curve with aggregated values can differ greatly with respect to the trend curve with raw values such that for a closer examination, an operator must increase the period until he is shown the trend curve with unadulterated raw data.

EP 3 805 882 A1 discloses a control system of a technical plant, which comprises an operator station client that is configured to generate XY trend diagrams to visualize measured values of technical objects of the technical plant.

FIG. 1 shows two exemplary trend curves, i.e., temporal courses of measured values of a measured variable. What is involved here is raw data, on the one hand, and aggregated data, on the other. As previously explained, as a rule, an operator of a technical plant is shown aggregated data. The aggregated data is contrasted with the raw data in FIG. 1 solely to clarify the adverse effect which the aggregation of the data can involve.

The raw data of the measured variables are symbolized by measuring points 2 and a trend curve 2a that connects the measuring points 2. The trend curve 2a represents an interpolation of the measuring points 2. Aggregated data derived from the raw data is represented therein as measuring points 3 with a cross, and a trend curve 3a (likewise identified by crosses) interpolating the measuring points 3 and connecting the measuring points 3. The raw data is aggregated in accordance with the mean value method in this example. This means that an aggregated measuring point 3 is calculated by temporally averaging two measuring points 2 respectively of the raw data before and after the aggregated measuring point 3.

It can be seen that a fuzziness, i.e., deviation, of the aggregated measuring points 3 varies with respect to the measuring points 2 of the raw data in the respective aggregation sections. Differences between the trend curve 2a of the raw data and the trend curve 3a of the aggregation data can also be located on the respective trend curves 2a, 3a, where the differences are sometimes so great that an operator of a technical plant must increase the aggregated trend curve 3a so much during the course of an assessment of the trend curves 2a, 3a that he is shown the trend curve 2a of the raw data.

A plurality of drawbacks is associated with the previously explained procedure. Firstly, the operator cannot identify which sections of an aggregated trend curve have high fuzziness. He therefore also cannot identify any sections for which the period up to raw data level has to be increased in order to gain an overview of the actual temporal course of a measured variable. Furthermore, owing to the sectional increase and reduction in the aggregated trend curve for representing raw data curves operators typically lose the "central theme" and lose themselves in overlapping periods. This is accompanied by increased loading times, which can entail the temporal increase and reduction.

EP 3 796 119 A1 discloses a control system which, for aggregated measured values, represents a minimum and a maximum value respectively of the measuring range on which an aggregated measuring point is based respectively. A type of fuzziness of the aggregated measuring point may be read hereby, although this proves to be laborious and less intuitive.

SUMMARY OF THE INVENTION

It is an object of the invention is to provide a control system for a technical plant, which enables more efficient handling of aggregated measurement data of the technical plant.

This and other objects and advantages are achieved in accordance with the invention by a control system of a technical plant, where the control system includes at least one operator station server and one operator station client, and where the operator station server includes a visualization service for outputting items of image information to the operator station client.

The operator station server configured to generate an item of image information about a temporal course of temporally aggregated measured values of the measured variable from a measured variable pertaining to a technical object of the technical plant. The visualization service is configured to transmit the item of image information about the temporal course of the temporally aggregated measured values of the measured variable to the operator station client. Additionally, the operator station client is configured to visually present the temporal course of the temporally aggregated measured values to an operator of the technical plant.

In accordance with the invention, the operator station server of the control system is configured to add to the temporally aggregated measured values respectively an item of information about which fuzziness the temporal aggregation of the respective measured value possesses in relation to the non-aggregated measured values considered for the temporal aggregation of the respective measured value, and configured to transmit the item of information to the operator station client, where the operator station client is further configured to visually present the item of information about fuzziness of the temporal aggregation of the temporally aggregated measured values to the operator of the technical plant together with the temporal course of the temporally aggregated measured values.

Inventively, the operator station server of the control system is configured to calculate for each temporally aggregated measured value to what extent the temporally aggregated measured value differs from the actual, non-aggregated measured values (the raw data therefore). This extent of the difference is referred to in the present context as fuzziness of the aggregation. The extent of the temporal aggregation can be calculated, for example, via a difference of the temporally aggregated measured value from the measured values (in relation to the raw measured values) used for calculating the temporally aggregated measured value.

The technical plant can be a plant from the process industry such as a chemical, pharmaceutical, petrochemical or a plant from the food and luxury food industry. This also includes any plant from the production industry, factories in which, for example, cars or goods of all kinds are produced. Technical plants, which are suitable for performing the inventive methods, can also come from the field of energy generation. Wind turbines, solar plants or power stations for generating energy are likewise incorporated by the term "technical plant".

These plants respectively have a control system or at least a computer-assisted module for controlling and regulating the proceeding process or production. In the present context a control system is taken to mean a computer-assisted technical system, which comprises functionalities for representing, operating and controlling a technical system, such as a manufacturing or production plant. The control system can comprise sensors for ascertaining measured values, as well as various actuators. In addition, the control system can comprise what are known as process-oriented components, which serve to actuate the actuators or sensors. Furthermore, the control system with the operator station client has means for visualizing the process plant. In addition, further computing units for more complex regulating processes and systems for data storage and processing should also be incorporated by the term "control system".

In the present context, an "operator station server" is taken to mean a server that centrally captures data of a management and monitoring system and, as a rule, alarm and measured value archives of a control system of a technical plant and makes this available to users ("operators"). As a rule, the operator station server establishes a communications link to automation systems of the technical plant and forwards data of the technical plant to what is known as the operator station client, which serves to manage and monitor operation of the individual functional elements of the technical plant. A conventional computer, which has a monitor unit, can serve as an operator station client. An operator station client can also be a smartphone, a tablet or the like, however.

The operator station client can be situated, together with the operator station server, inside the technical plant. However, it is also possible to situate the operator station server and/or the operator station client remotely, i.e., outside of the technical plant. In particular, the operator station client can be implemented in a Cloud, i.e., in a computer network outside of the technical plant.

The operator station server can have client functions in order to access the data (archives, reports, tags, variables) of other operator station servers. Images of operation of the technical plant on the operator station server can consequently be combined with variables of other operator station servers (server-server communication). The operator station server can be, without being limited hereto, a SIMATIC PCS 7 Industrial Workstation server belonging to SIEMENS.

An operator is taken to mean a human operator of the technical plant. The operator interacts with the technical plant or its control system and controls specific technical functions of the technical plant via specific user interfaces. For this, the operator can use a management and monitoring system (the operator station client in connection with the operator station server) of the control system.

A technical object is taken to mean a self-contained technical unit, which can be integrated in a higher-order control level. A technical object of this kind can be, for example, an amalgamation of a plurality of measuring points or a relatively large plant part of an industrial plant. The technical object is not required to originate from the field of industrial plants, however, but can also be, for example, a motor module of a car, and/or a ship.

With the aid of the inventive control system, the operator can manage and monitor the technical plant more efficiently and also more safely, in particular via the visual reproduction of the fuzziness of a temporal aggregation of measured values represented in a temporal course diagram. Preferably, the control system is configured to present to the operator of the technical plant an item of visual information that a temporal aggregation has occurred in the measured values visually presented to him. Consequently, the operator does not have to laboriously manually enquire first of all whether measured values, which are visually presented by the operator station client in a temporal course diagram, are subject to a temporal aggregation.

The control system is inventively configured to visually present the information about the fuzziness of the temporal aggregation of the temporally aggregated measured values to the operator of the technical plant such that the size of a visual representation of a respective temporally aggregated measured value depends on the fuzziness of the temporal aggregation of the temporally aggregated measured values. Such a representation of the fuzziness intuitively shows the operator whether a particular measured value was strongly or less strongly temporally aggregated. If the temporally aggregated measured value is larger in the visual representation, then the representation along a value axis of the temporal course will also be less sharp or less accurate, i.e., an amount of the temporally aggregated measured value can be only imprecisely ascertained visually, and this can especially efficiently indicate to the operator that the temporally aggregated measured value has a high level of uncertainty/fuzziness. The possibility of representing the temporally aggregated measured values in a circular shape represents an advantageous characteristic of the control system.

In the context of a preferred embodiment of the invention, the control system is configured to visually represent to the operator, in response to a selection of a temporally aggregated measured value visually represented to the operator, the non-aggregated measured values underlying the temporally aggregated measured value. In other words, each temporally aggregated measured value is advantageously interactive in order to be able to initiate raw data detailing without having to change the period of the currently represented temporal course. In the context of the advantageous configured of the control system therefore, with selection of the aggregated measured value a further (detailing) trend curve is opened (trend loop-in), which represents the course of the raw data of the aggregated measured value, i.e., the raw measured values used for the temporal aggregation of the measured value (optionally within a particular period around the instant of the aggregated measured value). If the operator would like to review the underlying raw measured data for a temporally aggregated measured value indicated with a high degree of fuzziness, then he is not required to increase the temporal course and delay the period until the trend curve is composed of raw measured values, as previously necessary, instead he only has to initiate the previously described "loop-in" by selecting the temporally aggregated measured value respectively. This characteristic makes the control system much more efficient and resource-saving than known control systems.

The control system can advantageously be configured to conduct the visual representation of the non-aggregated measured values underlying the selected, temporally aggregated measured value parallel to the visual representation of the temporal course of the temporally aggregated measured values. The operator is consequently given an overview both of the temporally aggregated measured values as well as of the underlying raw measured values, which are not temporally aggregated.

Preferably, the operator station client of the control system is configured to communicate to the operator station server demands on the temporal aggregation, using which demands the operator station server can conduct the temporal aggregation of the measured values. As a demand the operator station client can define, for example, a number of pixels available to it for visual representation or a font size or the like.

The above objects and advantages are achieved in accordance with the invention, moreover, by the use of a control system, as was previously explained, for operating a technical plant.

The above objects and advantages are achieved in accordance with the invention, moreover, by a method for visual representation of temporally aggregated measured values, comprising a) generating an item of image information about a temporal course of temporally aggregated measured values of a measured variable pertaining to a technical object of a technical plant via an operator station server of a control system of the technical plant, b) adding an item of information to the item of image information about which fuzziness the temporal aggregation of a respective temporally aggregated measured value possesses in relation to the non-aggregated measured values considered for the temporal aggregation of the respective measured value, c) transmitting the item of image information to an operator station client, d) visually presenting the temporal course of the temporally aggregated measured values and the information about the fuzziness of the respective temporal aggregation of the temporally aggregated measuring points to an operator of the technical plant.

The information about the fuzziness of the temporal aggregation of the temporally aggregated measured values is visually presented to the operator of the technical plant such that the size of a visual representation of a respective temporally aggregated measured value depends on the fuzziness of the temporal aggregation of the temporally aggregated measured values.

The temporally aggregated measured values are visually represented in a circular shape.

Preferably, the operator of the technical plant is presented with an item of visual information that a temporal aggregation has occurred in the visually presented measured values.

The non-aggregated measured values underlying the temporally aggregated measured value can be visually represented to the operator in response to a selection of a temporally aggregated measured value visually represented to the operator.

Preferably, the visual representation of the non-aggregated measured values underlying the selected, temporally aggregated measured value is conducted parallel to the visual representation of the temporal course of the temporally aggregated measured values.

Particularly preferably, the operator station client communicates to the operator station server demands on the temporal aggregation, using which demands the operator station server conducts the temporal aggregation of the measured values.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved will become clearer and more comprehensible in conjunction with the following description of the exemplary embodiment, which will be explained in more detail in conjunction with the drawings, in which.

DETAILED DESCRIPTION OF THE
EXEMPLARY EMBODIMENTS

Figure 1:
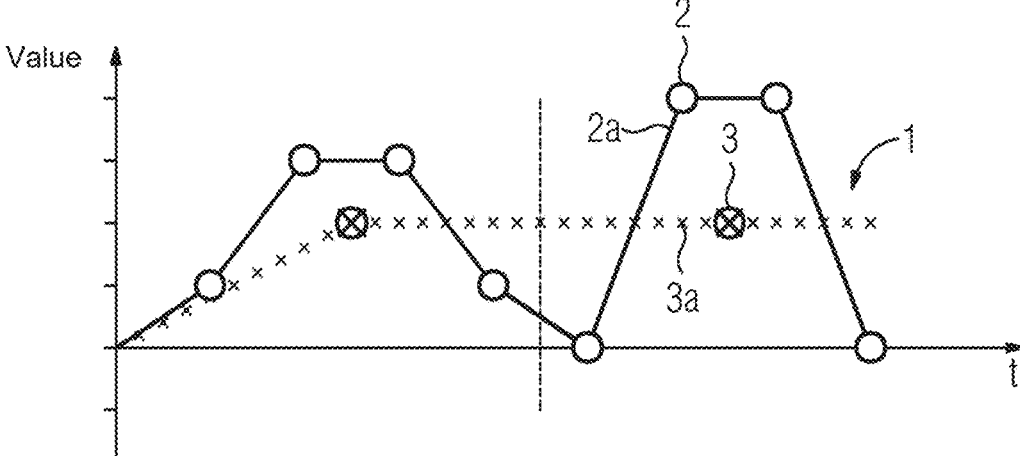
FIG. 1 shows temporal courses of measured values of a measured variable.
Figure 2:
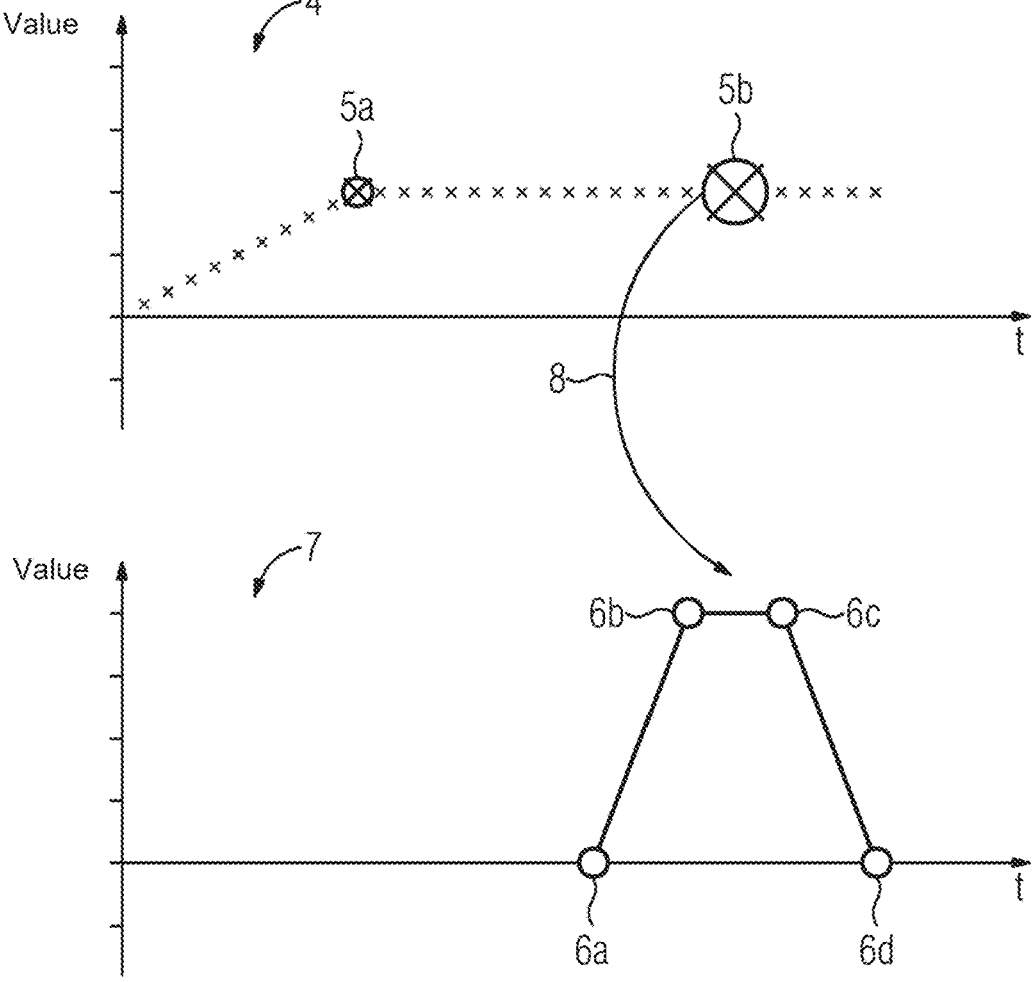
FIG. 2 shows a temporal course of temporally aggregated measured values and a temporal course of associated raw measured values.
Figure 3:
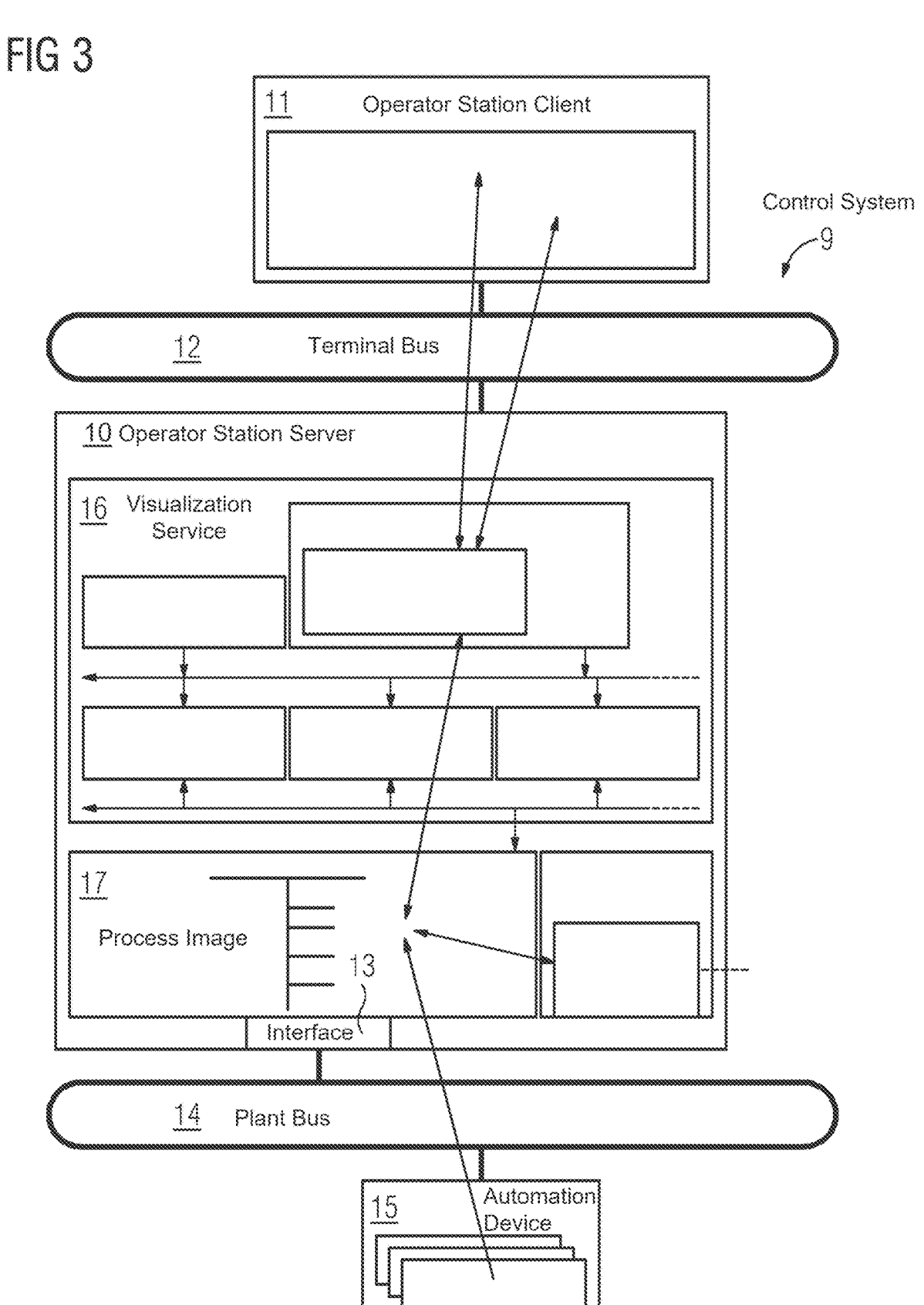
FIG. 3 shows a schematic block diagram of a part of control system in accordance with the invention.

FIG. 2 shows in a first temporal course 4 two measured values 5a, 5b of a measured variable of a technical plant, as is visually presented to an operator of the technical plant by means of an operator station client (cf. in this regard the description of FIG. 3). These are temporally aggregated measured values 5a, 5b. The measured value 5b represented on the right in FIG. 2 has been calculated by a temporal aggregation (here: a mean value method) from four raw measured values 6a, 6b, 6c, 6d. The four raw measured values 6a, 6b, 6c, 6d are represented in a second temporal course 7 in the lower region of FIG. 2.

The two temporally aggregated measured values 5a, 5b are represented in a circular shape and have different sizes (i.e., in this case: diameters). The larger represented measured value 5b has greater fuzziness than the smaller represented measured value 5a. By selecting a measured value 5a, 5b (for example, by clicking with a computer mouse), an operator of the technical plant can have a temporal course of the associated raw measured values displayed. In FIG. 2, this is symbolized by an arrow 8, which points from the right-hand, temporally aggregated measured value 5b to the four measured values 6a, 6b, 6c, 6d underlying the temporal aggregation. The operator can consequently easily gain a detailed overview of periods in which possibly critical items of information are concealed by the aggregation.

FIG. 3 represents part of an inventive control system 9 of a process plant. The control system 9 comprises a server of an operating system or an operator station server 10 and an associated operator station client 11. The operator station server 10 and the operator station client 11 are connected to one another and to further components of the control system 9 (not shown), such as an engineering system server or a process data archive, by a terminal bus 12.

In the context of management and monitoring, a user or an operator has access via the operator station client 11 via the terminal bus 12 to the operator station server 10. The terminal bus 12 can be configured, for example, as an industrial Ethernet, without being limited hereto.

The operator station server 10 has a device interface 13, which is connected to a plant bus 14. The operator system server 10 can communicate with an automation device 15 of the control system 9 via this interface. The plant bus 14 can be configured, for example, as an industrial Ethernet, without being limited hereto. The automation device 15 can, in turn, be connected to any desired number of subsystems (not represented).

Integrated in the operator station server 10 is a visualization service 16 via which (visualization) data can be transmitted to the operator station client 11. In addition, the operator station server 10 has a process image 17 of the process plant.

The sequence of an inventive method will be explained below. On the operator station client 11 an operator of the process plant selects a temporal course (a trend curve) of a measured value pertaining to a measured variable of a technical object (which technical object is automated via the automation device 15), which he would like to have visualized. The operator station client 11 communicates to the operator station server 10 demands which are to be made of the temporal aggregation of the measured values to be presented. These can be, for example, a number of available pixels or a font size or the like.

The operator station server 10 performs a temporal aggregation of the measured values stored in the process image 17 (i.e., the raw data) based on the demands of the operator station client 11. The operator station server 10 adds to each temporally aggregated measured value or the item of image information generated for this an item information for the operator station client 11 about which fuzziness the temporal aggregation of the respective temporally aggregated measured value has in relation to the non-aggregated measured values considered for the temporal aggregation of the respective measured value. The fuzziness can be calculated, for example, by adding up differences of the temporally aggregated measured values from the underlying measured values.

The temporally aggregated measured values are transmitted to the operator station client 11 with the added items of information in respect of the fuzziness as an item of image information. Trend courses 4, 7 are subsequently visually presented to the operator, as may be seen, for example, in FIG. 2. It can be signaled to the operator via an appropriate text message whether a particular trend course involves aggregated measured values or normal measured values (raw data).

Figure 4:
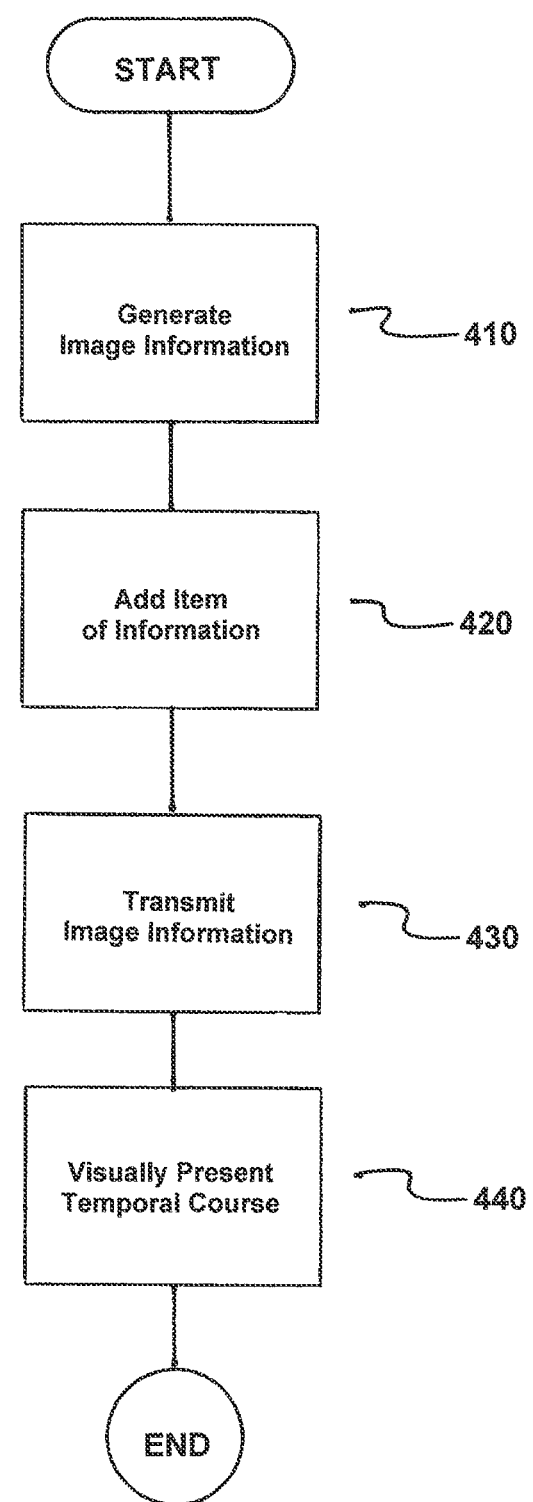
FIG. 4 is a flowchart of the method in accordance with the invention.

FIG. 4 is a flowchart of the method for visual representation of temporally aggregated measured values 5a, 5b. The method comprises a) generating an item of image information representing a temporal course of temporally aggregated measured values 5a, 5b of a measured variable pertaining to a technical object of a technical plant via an operator station server 10 of a control system 9 of the technical plant, as indicated in step 410.

Next, b) an item of information is added to the item of image information about which fuzziness the temporal aggregation of a respective temporally aggregated measured value 5a, 5b possesses in relation to the non-aggregated measured values 6a, 6b, 6c, 6d considered for the temporal aggregation of the respective measured value, as indicated in step 420. In accordance with the method, the fuzziness of the temporal aggregation of the respective temporally aggregated measured value 5a, 5b is a deviation of the respective temporally aggregated measured value 5a, 5b from the non-aggregated measured values (6a, 6b, 6c, 6d) considered for the temporal aggregation of the respective temporally aggregated measured value 5a, 5b.

Next, c) the item of image information is transmitted to an operator station client 11, as indicated in step 430.

Next, d) the temporal course of the temporally aggregated measured values 5a, 5b and the information about the fuzziness of the respective temporal aggregation of the temporally aggregated measuring points 5a, 5b are visually presented to an operator of the technical plant, as indicated in step 440. In accordance with the method of the invention, the information about the fuzziness of the temporal aggregation of the temporally aggregated measured values 5a, 5b is visually presented to the operator of the technical plant such that a size of a visual representation of a respective temporally aggregated measured value 5a, 5b depends on the fuzziness of the temporal aggregation of the temporally aggregated measured values 5a, 5b, and the temporally aggregated measured values 5a, 5b is visually represented in a circular shape.

Although the invention has been illustrated and described in detail by the preferred exemplary embodiment and the figures, it is not limited by the disclosed examples and a person skilled in the art can derive other variations herefrom without departing from the scope of the invention. Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control system for a technical plant, comprising:

at least one operator station server; and an operator station client, the operator station server including a visualization service for outputting items of image information to the operator station client;

wherein the operator station server is configured to generate an item of image information representing a temporal course of temporally aggregated measured values of a measured variable from a measured variable pertaining to a technical object of the technical plant;

wherein the visualization service is configured to transmit the item of image information about the temporal course of the temporally aggregated measured values of the measured variable to the operator station client;

wherein the operator station client is configured to visually present the temporal course of the temporally aggregated measured values to an operator of the technical plant;

wherein the operator station server is further configured to add to the temporally aggregated measured values an item of information respectively about which fuzziness the temporal aggregation of the respective measured value possesses in relation to the non-aggregated measured values considered for the temporal aggregation of the respective measured value, and to transmit the item of information to the operator station client, the fuzziness of the temporal aggregation of the respective temporally aggregated measured value forming a deviation of the respective temporally aggregated measured value from the non-aggregated measured values considered for the temporal aggregation of the respective temporally aggregated measured value;

wherein the operator station client is further configured to visually present the item of information about the fuzziness of the temporal aggregation of the temporally aggregated measured values to the operator of the technical plant together with the temporal course of the temporally aggregated measured values such that a size of a visual representation of a respective temporally aggregated measured value depends on the fuzziness of the temporal aggregation of the temporally aggregated measured values; and wherein the control system is configured to visually represent the temporally aggregated measured values in a circular shape.

2. The control system as claimed in claim 1, wherein the control system is configured to present to the operator of the technical plant an item of visual information which indicates a temporal aggregation has occurred in the visually presented measured values.

3. The control system as claimed in claim 1, wherein the control system is configured to visually represent to the operator, in response to a selection of a temporally aggregated measured value visually represented to the operator, the non-aggregated measured values underlying the temporally aggregated measured value.

4. The control system as claimed in claim 3, wherein the control system is configured to conduct the visual representation of the non-aggregated measured values underlying the selected, temporally aggregated measured value in parallel to the visual representation of the temporal course of the temporally aggregated measured values.

5. The control system as claimed in claim 1, wherein the operator station client is further configured to communicate to the operator station server demands on the temporal aggregation, based on which the operator station server conducts the temporal aggregation of the measured values.

6. The control system as claimed in claim 1, wherein the control system operates the technical plant.

7. A method for visual representation of temporally aggregated measured values, comprising:

a) generating an item of image information representing a temporal course of temporally aggregated measured values of a measured variable pertaining to a technical object of a technical plant via an operator station server of a control system of the technical plant;

b) adding an item of information to the item of image information about which fuzziness the temporal aggregation of a respective temporally aggregated measured value possesses in relation to the non-aggregated measured values considered for the temporal aggregation of the respective measured value, the fuzziness of the temporal aggregation of the respective temporally aggregated measured value being a deviation of the respective temporally aggregated measured value from the non-aggregated measured values considered for the temporal aggregation of the respective temporally aggregated measured value;

c) transmitting the item of image information to an operator station client;

d) visually presenting the temporal course of the temporally aggregated measured values and the information about the fuzziness of the respective temporal aggregation of the temporally aggregated measuring points to an operator of the technical plant, the information about the fuzziness of the temporal aggregation of the temporally aggregated measured values being visually presented to the operator of the technical plant such that a size of a visual representation of a respective temporally aggregated measured value depends on the fuzziness of the temporal aggregation of the temporally aggregated measured values, and the temporally aggregated measured values being visually represented in a circular shape.

8. The method as claimed in claim 7, wherein the operator of the technical plant is presented with visual information indicating that a temporal aggregation has occurred in the visually presented measured values.

9. The method as claimed in claim 7, wherein the non-aggregated measured values underlying the temporally aggregated measured value are visually represented to the operator in response to a selection of a temporally aggregated measured value visually represented to the operator.

10. The method as claimed in claim 8, wherein the non-aggregated measured values underlying the temporally aggregated measured value are visually represented to the operator in response to a selection of a temporally aggregated measured value visually represented to the operator.

11. The method as claimed in claim 9, wherein the visual representation of the temporally non-aggregated measured values underlying the selected, temporally aggregated measured value is conducted in parallel to the visual representation of the temporal course of the temporally aggregated measured values.

12. The method as claimed in claim 7, wherein the operator station client communicates to the operator station server demands on the temporal aggregation for use by the operator station server to conduct the temporal aggregation of the measured values.

13. The method as claimed in claim 8, wherein the operator station client communicates to the operator station server demands on the temporal aggregation for use by the operator station server to conduct the temporal aggregation of the measured values.

14. The method as claimed in claim 9, wherein the operator station client communicates to the operator station server demands on the temporal aggregation for use by the operator station server to conduct the temporal aggregation of the measured values.

15. The method as claimed in claim 11, wherein the operator station client communicates to the operator station server demands on the temporal aggregation for use by the operator station server to conduct the temporal aggregation of the measured values.

* * * * *